US006870648B2

(12) United States Patent
Sesek et al.

(10) Patent No.: US 6,870,648 B2
(45) Date of Patent: Mar. 22, 2005

(54) APPARATUS, METHOD AND SYSTEM FOR SCANNING A BOUNDED SCAN AREA OF A SCANNING DEVICE

(75) Inventors: Robert Sesek, Boise, ID (US); Christian L. Struble, Boise, ID (US); J. Michael Dunlap, Horseshoe Bend, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 624 days.

(21) Appl. No.: 09/783,796

(22) Filed: Feb. 12, 2001

(65) Prior Publication Data

US 2002/0109867 A1 Aug. 15, 2002

(51) Int. Cl.[7] ................................................. H04N 1/04
(52) U.S. Cl. ....................... 358/488; 358/486; 358/497; 358/474; 358/453; 399/379; 399/380; 399/211
(58) Field of Search ................................ 358/488, 486, 358/497, 494, 474, 453, 401, 471, 449, 496, 442; 399/376–380, 372, 211; 355/75, 40; 382/312, 319, 318; 250/208.1, 234–236

(56) References Cited

U.S. PATENT DOCUMENTS 4,518,999 A * 5/1985 Kurata et al. ................ 358/488

5,818,610 A * 10/1998 Bromley et al. ............ 358/473

FOREIGN PATENT DOCUMENTS

| GB | 2152323 | 7/1985 |
| JP | 59-104859 | 6/1984 |

* cited by examiner

*Primary Examiner*—Cheukfan Lee

(57) ABSTRACT

An apparatus and system for scanning a bounded scan area within a scanable surface of a scanning device are provided. The present invention includes a plurality of members constructed and arranged to define a scan area on a scanable surface of the scanner, a link for communicating with the control interface of the scanner, and a switch for generating a signal to the control interface to initiate and complete a scan of the bounded scan area defined by the plurality of members.

The scanning apparatus and system further provide a method for scanning a bounded scan area, which includes the steps of determining whether the scan area is contained entirely within the enclosed scanable surface, scanning the scanable portion of the scan area if the enclosed scan area is not contained entirely within the scanable surface, and scanning the entire scan area if the scan area is contained entirely within the scanable surface.

23 Claims, 8 Drawing Sheets

APPARATUS, METHOD AND SYSTEM FOR SCANNING A BOUNDED SCAN AREA OF A SCANNING DEVICE

The present invention generally relates to an improved apparatus, method and system for scanning a scan area within a scanable surface of a scanning device. More specifically, it relates to an apparatus, method and system for scanning a bounded scan area within a scanable surface or bed using positioning apparatus that can define the enclosed or bounded scan area.

Scanning peripherals, such as scanners, multifunction peripherals or copiers, are becoming a larger segment of the peripheral industry. Users find such peripherals useful for inputting text, graphics and images into a digital data format, which then can be stored, manipulated or processed. Flatbed scanners are one of the most common types of scanners, and they are available in a variety of shapes and sizes. When a specific image is to be scanned, the document is generally placed on the scan glass portion or bed surface of the scanner and the entire document is scanned by the scanner. However, a user may want to scan and input only a portion of the document.

One prior method involved a user employing a separate software program (after the document was scanned and resulted in a digital file being produced) to manipulate the file of the image to obtain the desired portion of the document. The revised image was then sent to the user's desired destination, such as a printer.

Another prior method involved the user taking the scanned document and physically trimming the document to obtain the desired portion of it. The trimmed document was again scanned to obtain an image of only the desired portion. Furthermore, this method often resulted in a poor quality result, particularly if the process was iteratively performed.

These prior methods were problematic because the user had to physically manipulate the document or use program software to obtain the desired portion of the document. A better solution would enable the user to direct the scanner to scan only the desired portion, which could achieve the desired if not superior result with less time and effort by the user.

BRIEF SUMMARY OF THE INVENTION

The present invention generally relates to an improved apparatus, method and system for scanning a bounded scan area of a scanning device, such as a flatbed or other scanner or a copier.

The present invention provides an improved apparatus, method and system for scanning an enclosed scan area of a scanable surface of a scanning device wherein the apparatus has various implementations of a positioning mechanism for defining the size and shape of the enclosed scan area. One embodiment of the present invention includes pointer or bar mechanisms constructed and arranged to define an enclosed scan area of the scanable surface of the scanner and provide signals that are indicative of the parameters or coordinates of the scan area, which signals are communicated to a control interface of the scanner, and a pushbutton or other switch for initiating the control interface to scan the enclosed scan area defined by the mechanism.

In one embodiment, a method for scanning an enclosed scan area includes the steps of determining whether the scan area is contained entirely within the scan surface, scanning whatever portion of the bounded scan area can be scanned if the scan area is not contained entirely within the scanable surface, and scanning the entire scan area if it is contained entirely within the scanable surface.

DETAILED DESCRIPTION

Broadly stated, the present invention is directed to an improved apparatus, method and system for scanning a bounded scan area of a scanning device. The present invention allows a scanning device to scan only a user defined enclosed scan area of a document by using a pair of positioning apparatus. Because of the positioning apparatus, additional user manipulation is unnecessary, since the scanner automatically scans the user defined enclosed or bounded scan area. As a result, only the user defined enclosed scan area is outputted and sent as a digital file to the previously specified destination, such as a printer.

Figure 1:
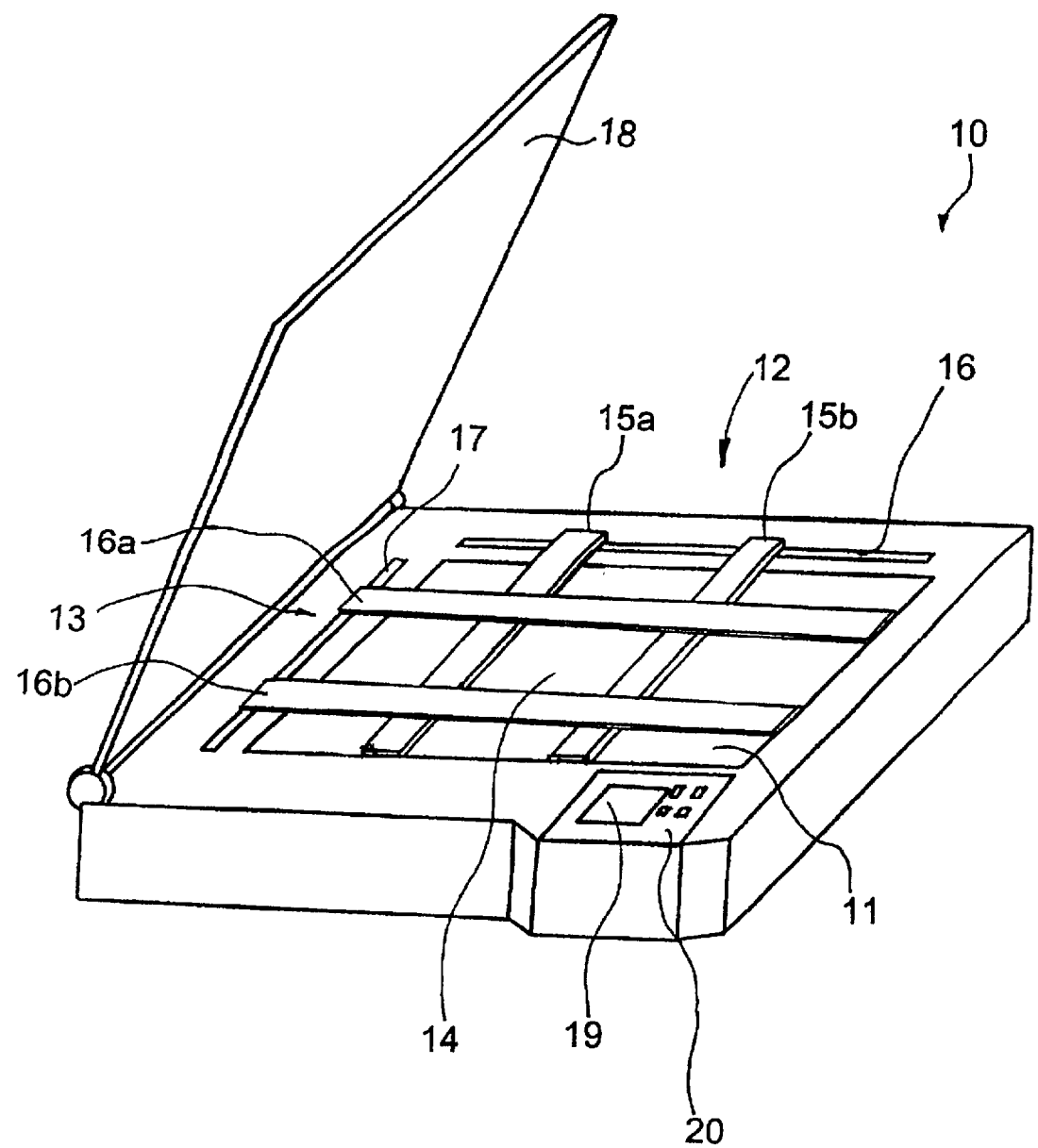
FIG. 1 is a perspective view of a scanning device implemented with an internal positioning apparatus, particularly illustrating slidable bars.

Turning now to FIG. 1, a perspective view of a scanning device implemented with an internal positioning apparatus is shown and indicated generally at 10. The scanning device 10 includes a flat bed surface 11 that is generally made of glass material. The flat bed surface 11 generally defines the entire scanable surface of the scanning device, although it should be understood that the actual dimensions of the glass surface 11 may be slightly larger than the area that is actually scanable. There are typically markings adjacent the surface which define the limits of the scan. The scan document is placed face down on the flat bed surface 11. The scanning device 10 further includes a pair of internal positioning apparatus 12, 13 that are designed to define an adjustable enclosed or bounded scan area 14 of the entire scanable surface 11. The positioning apparatus 12, 13 are integrated into the scanning device 10, and therefore have internal components as will be described.

In this implementation, the positioning apparatus 12 includes a pair of elongated bars 15a and 15b having an end portion that is retained and slidable in a recess or groove 16. For purposes of definition, the recess 16 is considered to comprise the x-axis and the bars 15a and 15b are therefore movable along the x-axis. The apparatus 13 is similarly constructed and includes bars 16a and 16b that are retained and slidable in a recess 17, which is defined as the y-axis.

While the elongated bars are illustrated in FIG. 1, it should be understood that the bars could be replaced with pointers of the type shown in FIGS. 2, 3, 5 and 9–13. The use of bars may enable some users to define the scan area 14 more precisely because the bars physically extend into the scanable surface 11, and in fact extend generally the entire length or width of the entire scanable surface 11 in the embodiment illustrated. Pointers may be considered to be as convenient to other users, because they do not physically interfere with the material placed on the scanable surface 11 and may not be as susceptible to damage during use. Also, if the scanner has an automatic feeder mechanism, pointers do not extend onto the surface 11, and therefore would not interfere with documents being automatically positioned on the surface.

Figure 2:
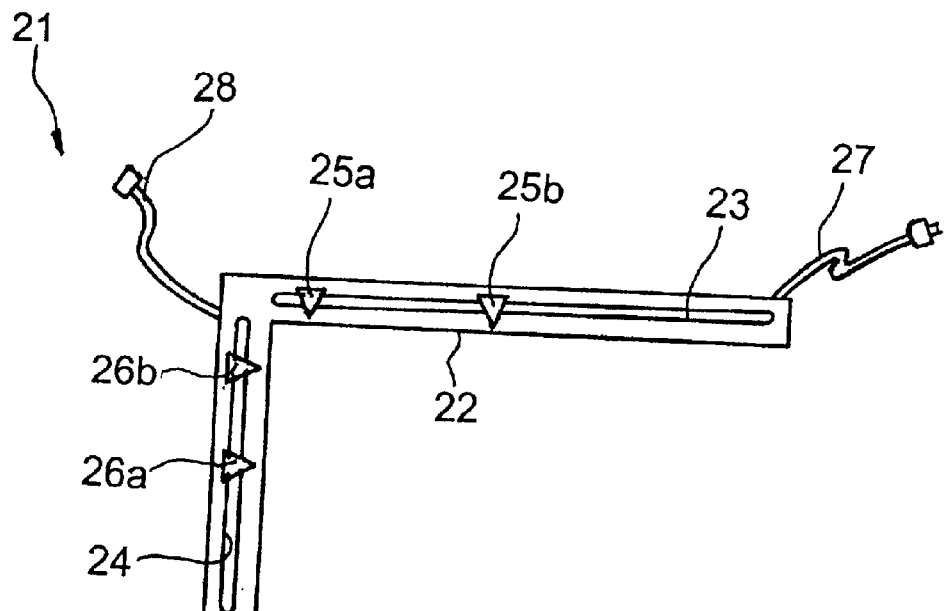
FIG. 2 is a plan view of an external positioning apparatus for a standard scanning device, particularly illustrating slidable pointers.
Figure 3:
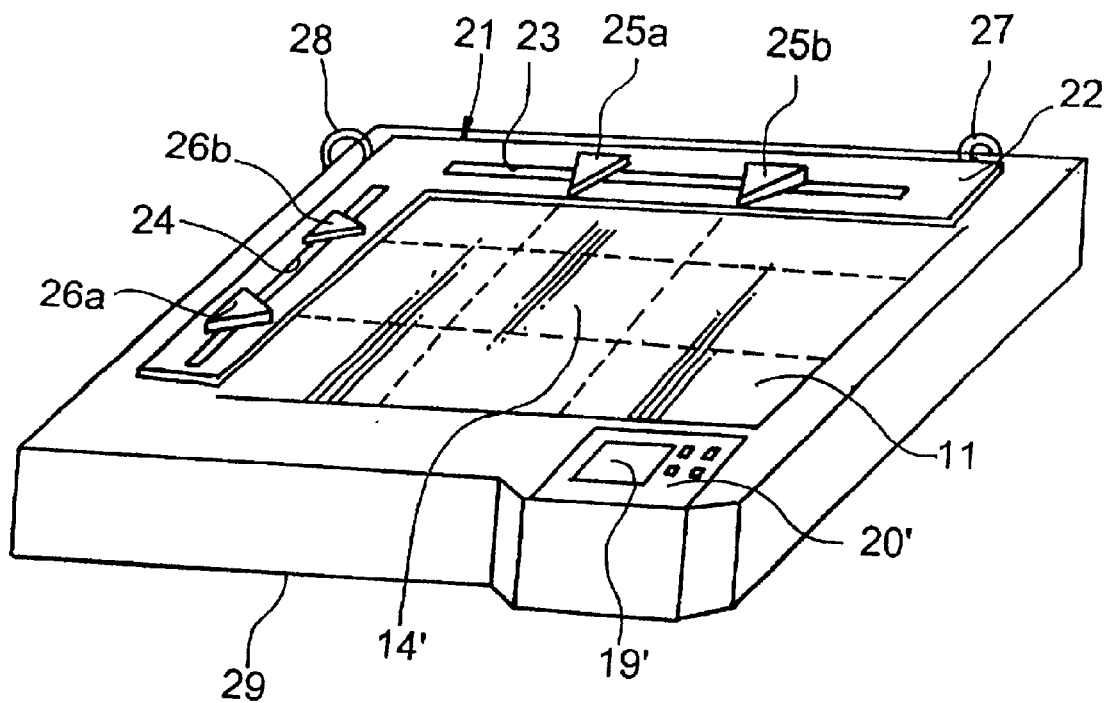
FIG. 3 is a perspective view of a scanning device implemented with an external positioning apparatus shown in FIG. 2.
Figure 9:
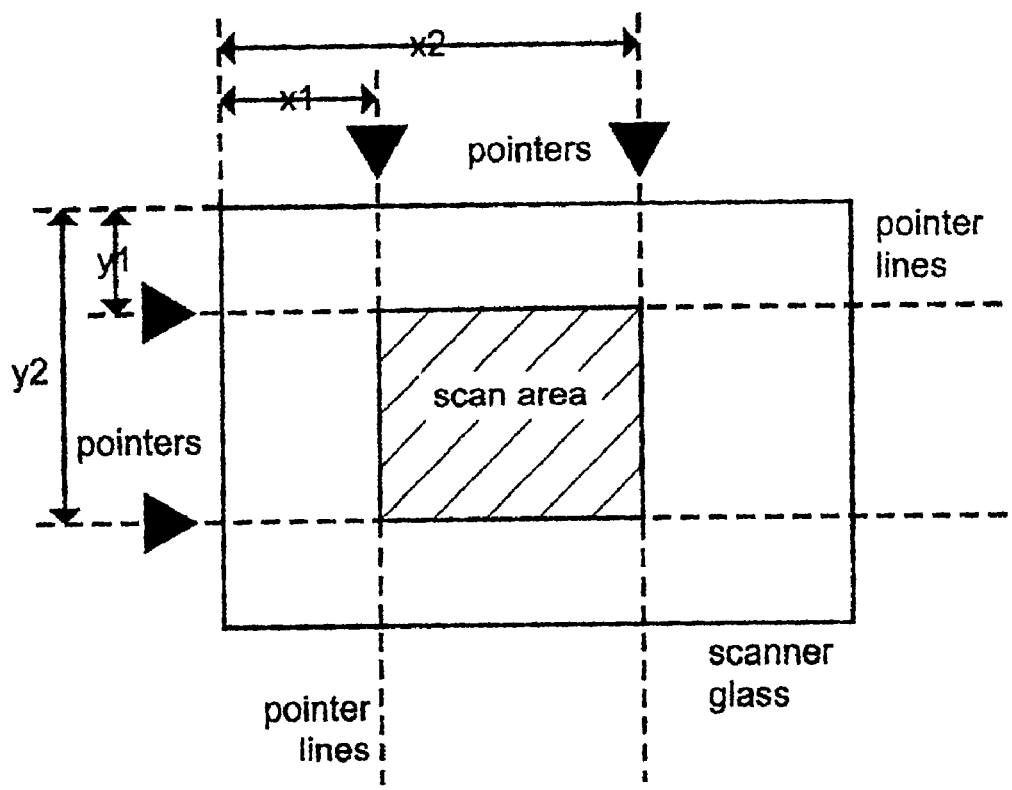
FIG. 9 is a diagram of a rectangular enclosed scan area defined by pointers from the implementations shown in FIGS. 2 and 3.

Regardless of whether the members comprise pointers or bars, in the embodiments of FIGS. 1–3 define an enclosed or bounded rectangular scan area as shown in FIG. 9. While the implementations of FIGS. 1–3 use four bars or pointers in two recesses to define an enclosed rectangular scan area, it should be understood that other scan areas having different shapes can also be defined. For example, each of the positioning apparatus can be implemented with two recesses and two pointers in each recess. With such an implementation in each of the x and y-axes, a total of 8 pointers can be used for defining the bounded scan area, which can then comprise a variety of shapes, such as a quadrilateral shape (shown in FIG. 10) and/or almost triangle shape(shown in FIG. 11). In the embodiment having four pointers for each axis shown in FIGS. 10–13, the pointers $X_{11}$ and $X_{21}$ are coupled together, as are $X_{12}$ with $X_{22}$, $Y_{11}$ with $Y_{21}$ and $Y_{12}$ with $Y_{22}$. The control interface contains software that can generate the incremental coordinates along the straight lines between the coupled pointers and thereby control the operation of the scan to create the enclosed scan area.

In fact, other implementations of the positioning apparatus can also be used. For example, instead of recesses, a pen device can be used along the x and y-axes on receptive strips used to define the pointers' positions to obtain various shapes and scan areas. It is also contemplated that a graphical user interface associated with a personal computer may be interconnected with the scanner and enable the user to define a scan area that may have various shapes and sizes of the entire scanable surface 11. These other implementations are contemplated and should be understood to be within the scope of the present invention.

Regardless of how the positioning apparatus is implemented, the scanning device 10 must be able to recognize the enclosed scan area 14 defined by the pointers 15a, 15b, 16a, 16b. In the internal positioning implementation of the present invention, it is preferred that an optical device be used to recognize the enclosed scan area defined by the pointers. A control interface, such as firmware or a processing means using firmware and/or software, is preferably used to initiate a scan and control the scan sensing devices and other components of the scanner to complete a scan and produce signals that comprise an electronic file of only the enclosed scan area instead of the entire scanable surface.

Once the pointers 15a, 15b, 16a, 16b are positioned and the enclosed scan area 14 is defined, a scanner cover 18 is desirably positioned to overlie the entire scanable surface 11, to minimize unwanted light which can degrade the quality of the resulting image. A scan button 19 can be provided on a control panel 20 to initiate a scan command to the scanning device 10. Alternatively, a scan command can also be sent to the scanner through scanning software residing on a personal computer that may be connected to the scanning device 10. The scanning device 10 will then respond by scanning either the entire scanable surface 11 or the enclosed scan area 14 depending upon the design of the control interface and implementation of the positioning apparatus.

Turning now to FIG. 2, another implementation of the present invention is shown to have external positioning apparatus for a standard scanning device is shown and indicated generally at 21. The external positioning apparatus has a generally L-shaped housing 22 with perpendicularly oriented recesses 23 and 24 in which slidable pointers 25a, 25b and 26a, 26b are respectively located. The device 21 is configured to be an external component that can be added onto the standard scanners and therefore is preferably as thin as possible so that it will not interfere with the closing of a cover or other aspects of the operation of the scanner. In other words, it is an add-on accessory component for standard commercial scanners. The external positioning apparatus 21 includes a cord 27 for connection to a power source and a communication link 28 for connection to the control interface of the scanning device (not shown). The link 28 is preferably a Universal Serial Bus cord and connector, since it is presently the standard communication interface for many commercial scanning devices. However, it is not limited to a Universal Serial Bus or any other protocols. Again, the use of recesses and pointers is just one implementation, and other implementations, such as a pen device to define the positioning of the pointers, are contemplated and are within the scope of the present invention.

A standard scanning device, indicated generally at 29 in FIG. 3, is implemented with the external positioning apparatus 21 shown in FIG. 2. As shown, the external positioning apparatus 21 is attached adjacent to the scanable surface 11' of the standard scanning device 29. A bounded scan area 14' is defined by the slidable pointers 25a, 25b, 26a and 26b. The link 28 is connected with the control interface (not shown) of the standard scanning device 29, which directs the scanning device to scan either the entire scanable surface 11' or the enclosed scan area 14'. When the enclosed scan area 14' is defined by the pointers 25a, 25b, 26a and 26b, the user can press the scan button 19' located on the control panel 20'. Alternatively, a scan command can also be sent to the scanning device through scanning software of a personal computer that is connected to the scanner 29.

Figure 4:
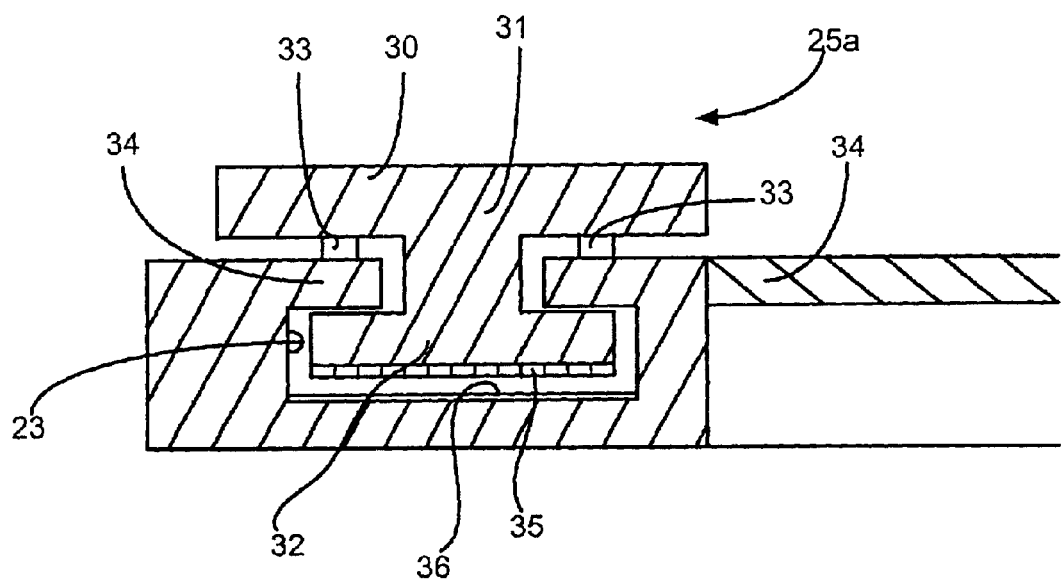
FIG. 4 is a partial elevation view of the groove or recess implementation with the use of optical guide pointers.
Figure 5:
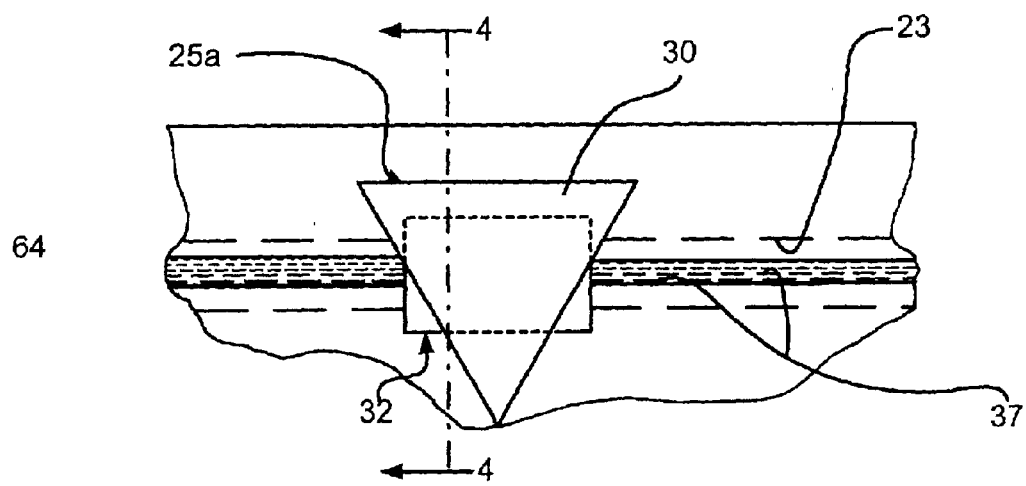
FIG. 5 is a partial plan view of the recess implementation shown in FIG. 4.

A recess implementation using an optical detecting pointer is shown in FIGS. 4 and 5, with FIG. 4 being a cross-section taken generally along the line 4—4 of FIG. 5. A representative pointer 25a, for example, has a triangular upper portion 30, a mid portion 31 and a lower rectangular portion 32. A pair of springs 33 or other resilient compressible material are attached to the underside of the upper portion 30 and contact a top wall portion 34 on each side of the opening between them. The upper surface of the lower portion 32 similarly contacts the underside of the top wall portions 34. The springs 33 thereby urge the pointer 25a upwardly as shown in FIG. 4, but the springs enable the pointer 25a to be moved within the recess 23 as is desired.

In this preferred embodiment, the pointer 25a, has an optical sensor 35 (shown in FIG. 4), attached to the bottom surface of the lower portion 32 in position to detect a layer 36 of digitally encoded indicia that is attached or printed to the bottom surface of the recess 23. For example, the indicia may comprise 8 of binary coded parallel lines 37 that extend along the recess 23. The parallel lines 37 have alternating dark and light increments, with the length of the increments in one line being one half of the length of increments in the adjacent line along the length of the recess. By having such marking, the sensor can detect the dark or light "state" of each line at a particular location and thereby identify its lateral position or coordinate along the axis of the recess. If greater or less accuracy is needed than eight lines, then lines can be added or removed as desired. The greater the number of lines, the better the accuracy in determining the position of the pointers along the length of the recess.

Figure 6:
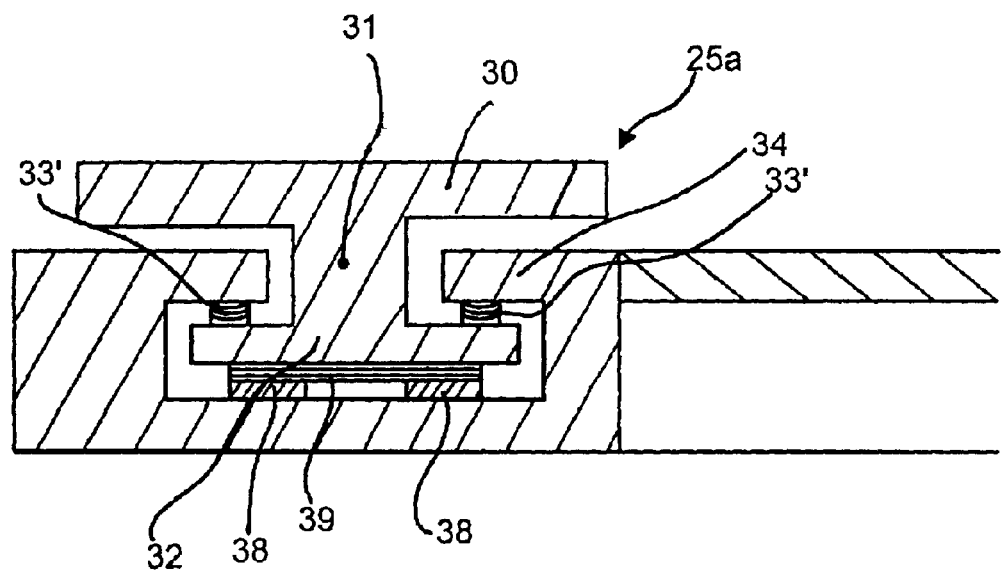
FIG. 6 is a partial elevation view of the recess implementation with the use of conductive stripe pointers.
Figure 7:
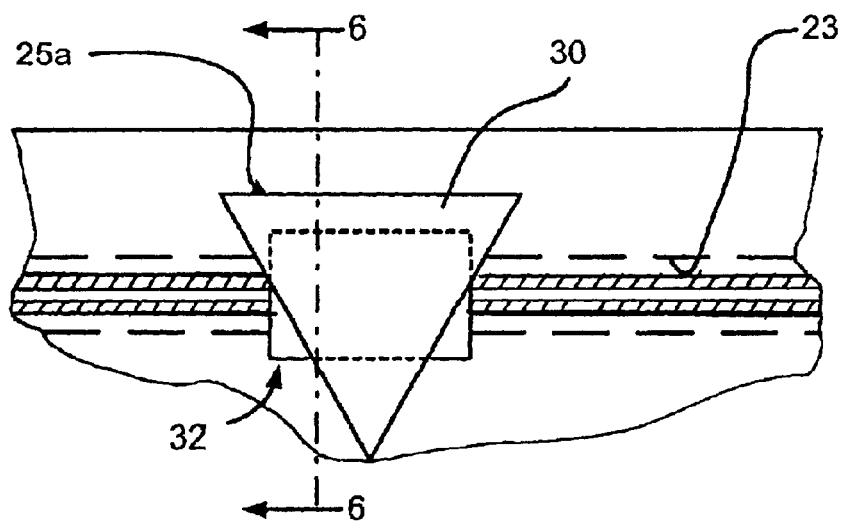
FIG. 7 is a partial plan view of the recess implementation shown in FIG. 6.

An alternative implementation uses electrical circuitry to determine the coordinate or lateral position of the pointer 25a in the recess 23 as shown in FIGS. 6 and 7, with the cross sectional view of FIG. 6 taken generally along the line 6—6 in FIG. 7. In this embodiment, a pair of resistive strips 38 are attached to the bottom of the recess (see FIG. 6) and a conductive strip 39 is attached to the bottom surface of the lower portion 32 of the pointer 25a in position to electrically interconnect the strips. Springs 33' are attached to the top surface of the lower portion 32 and are in position to contact the underside of top wall 34 and thereby bias the pointer downwardly so that the conductive strip 39 maintains contact with the resistive strips 38. As is well known in the art, movement of the pointer changes the total length of resistive strip from each end of the recess 23, and therefore changes the resistance value, and circuitry can measure either voltage or current values and thereby determine the position of the pointer. However, it should be noted that a variety of other implementations can be used to determine the position of the pointers, such as a rotary positioning optical guide, which is well known in the art. These and other implementations are contemplated and are within the scope of the present invention.

Figure 8:
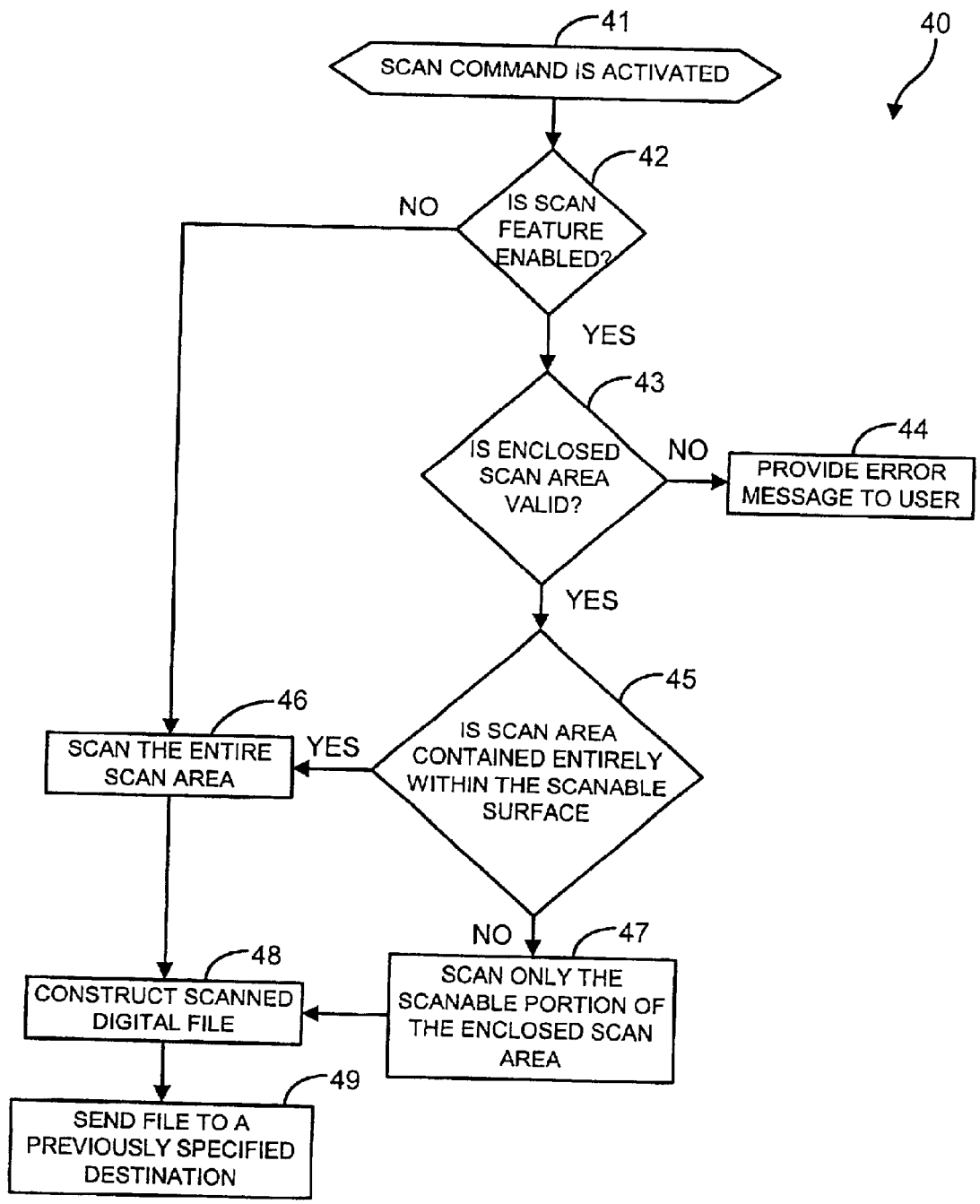
FIG. 8 is a flowchart of an exemplary scan method of the present invention.

Referring now to FIG. 8, a flowchart of an exemplary scan method for the positioning apparatus is shown and indicated generally at 40. The scan method is initiated by a scan command (block 41), which can be sent by pushing scan or copy button on the control panel or by software located on a computer that is connected to the scanning device. The scanning device first determines whether the enclosed scan area feature is enabled (block 42). If it is not enabled (block 43), the entire scanable surface of the scanning device will be scanned (block 46). If, however, the enclosed scan area feature is enabled (block 42), then it is determined whether the enclosed scan area is valid (block 43). In the preferred implementation (shown in FIG. 9), the enclosed scan area should be always be valid. However, in other implementations that allow for more complicated shapes, it may be possible to move the pointers in such a way that no valid enclosed scan area exists. An error message would then be returned to the user (block 44).

Figure 10:
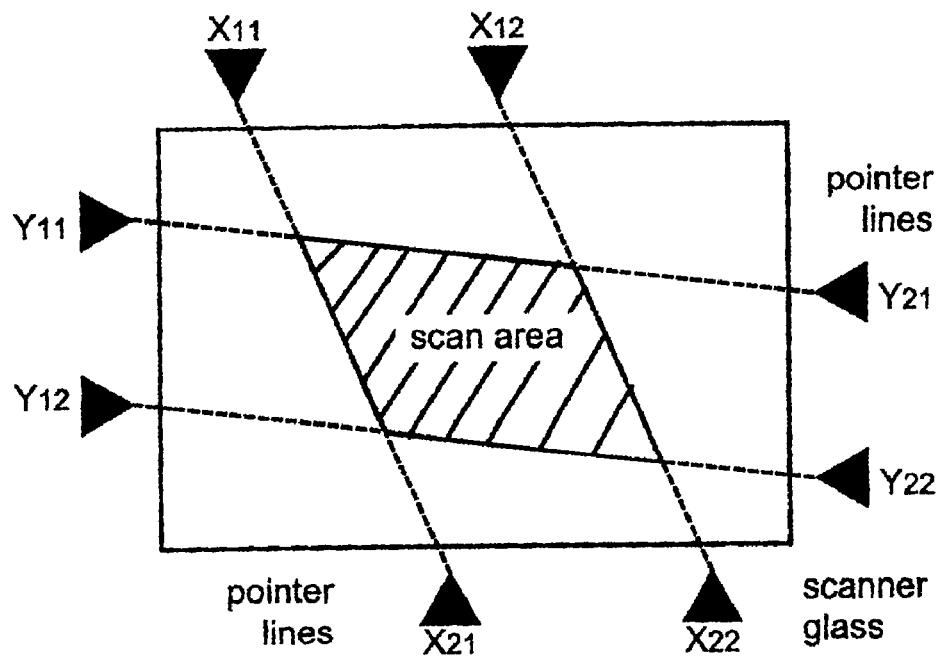
FIG. 10 is a diagram of a quadrilateral enclosed scan area defined by pointers from other alternative implementations.
Figure 11:
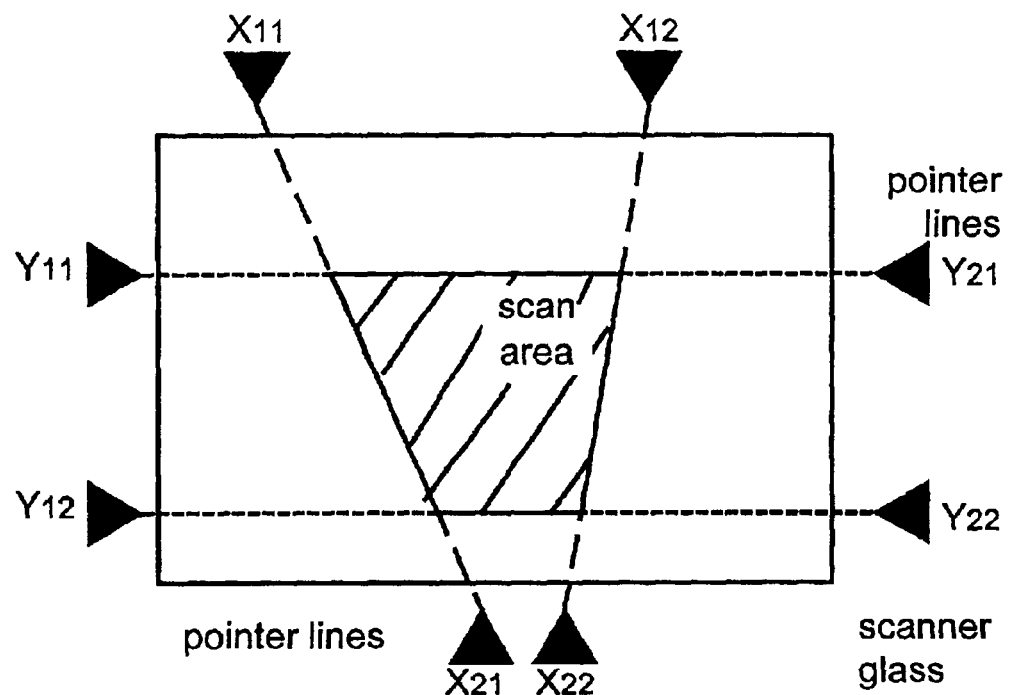
FIG. 11 is a diagram of a generally triangular enclosed scan area defined by pointers from other alternative implementations.
Figure 12:
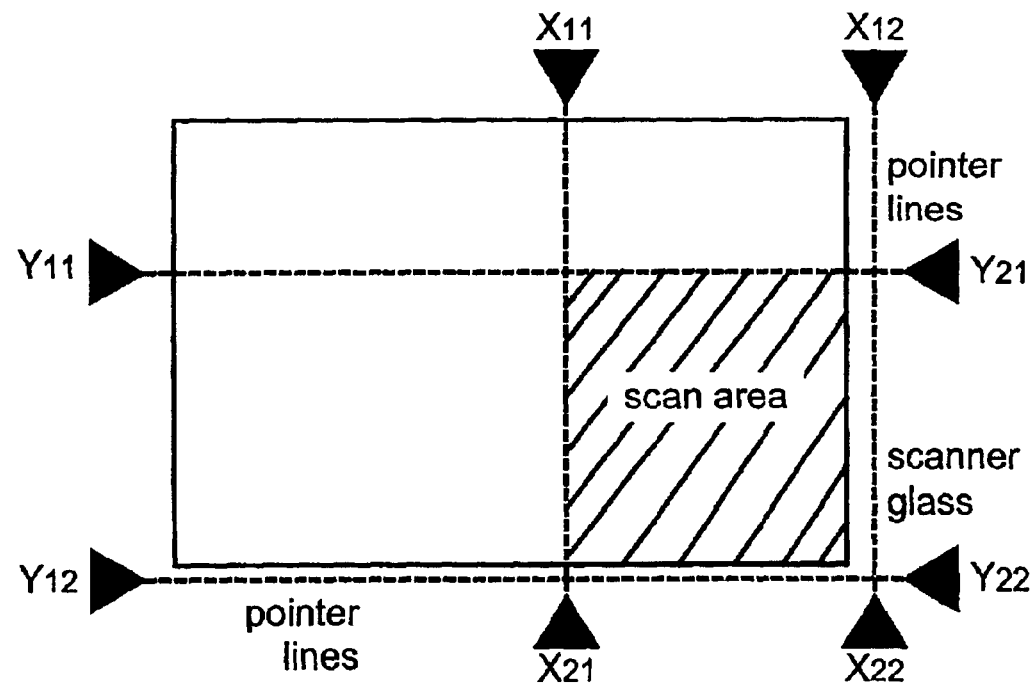
FIG. 12 is a diagram illustrating a bounded scan area that is partially outside the scanable surface of the scanning device; and, FIG. 13 is a diagram illustrating a bounded scan area that is completely outside the scanable surface of the scanning device.
Figure 13:
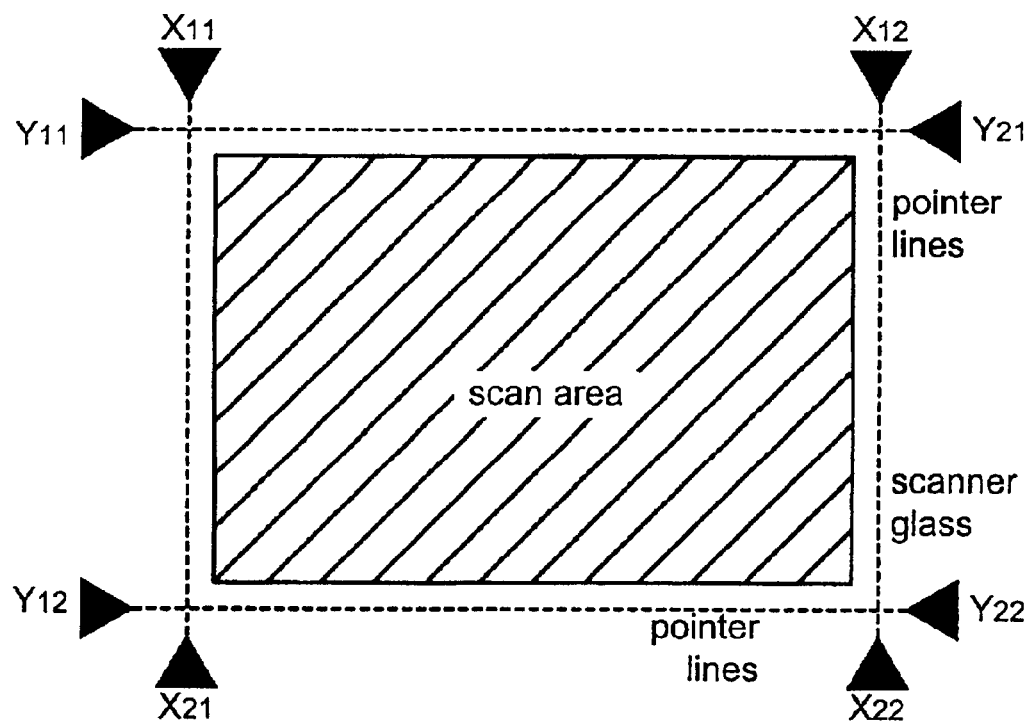

If, however, a valid enclosed scan area is found (block 43), the scanning device next determines if the scan area is contained entirely within the enclosed scanable surface (block 45). If so, the entire scanable surface of the scanning device will be scanned (block 92). An example of the entire scan area being contained within the enclosed scan area is shown in FIG. 13. However, if the enclosed scan area is not contained entirely within the scanable surface (block 45), the device scans the scanable portion of the enclosed scan area (block 47). FIGS. 9 and 10 show examples of enclosed scan areas which are completely contained within the scanable surface. FIGS. 12 and 13 show examples where a portion of the enclosed scan area lies outside of the scanable surface, in this case only the scanable portion of the enclosed scan area would be scanned (block 47). Once the area, either the entire scanable surface or the scanable portion of the enclosed scan area, is scanned, a digital file of the scanned image is constructed by the scanning device (block 48). The digital file is then sent out to the previously specified destination for this scan (block 49).

From the foregoing description, it should be understood that an improved apparatus, system and method for scanning a bounded scan area on a scanning device has been shown and described, which has many desirable attributes and advantages. The apparatus, system and method scans only a user defined enclosed scan area, instead of the scanning device scanning the entire scanable surface without additional user manipulation. Because the enclosed scan area can be defined on the scanning device, it is simpler to use than the traditional software manipulation. Users no longer have to use complicated software to perform a simple task of scanning only a bounded scan area. As a result, only the enclosed scan area image is constructed into a digital file and outputted to previously specified destination.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. Apparatus for defining a scan area within a scanable surface of a scanning device of the type which has a control interface that can initiate and control a scan operation responsive to a scan signal being received, said apparatus comprising:

a first set of slidable members located on a first axis adjacent the scanable surface for defining coordinates of the scan area along said first axis thereof and generating signals indicative of said coordinates;

a second set of slidable members located on a second axis generally perpendicular to said first axis, said second axis being adjacent the scanable surface, said second set of slidable members defining coordinates of the scan area along said second axis thereof and generating signals indicative of said coordinates; and a link for communicating said coordinate indicating signals to said control interface, wherein communication link comprise a conductor that can be connected to said control interface of the scanning device.

2. Apparatus as defined in claim 1 further comprising a generally L-shaped housing to which said first and second sets of slidable members are attached, said apparatus being an external attachment to a standard scanner and located adjacent the scanner surface thereof, said link extending from said housing to the control interface of the scanner.

3. Apparatus as defined in claim 1 wherein said first set of slidable members comprise two members that are located and retained in a first recess extending along said first axis, said two members being independently slidable therein and positionable along the scanable surface to define two coordinates on said first axis, the distance between said coordinates comprising the dimension of the scan area at least immediately adjacent the scanable surface.

4. Apparatus as defined in claim 3 wherein said second set of slidable members comprise two members that are located and retained in a second recess extending along said second axis, said two members being independently slidable therein and positionable along the scanable surface to define two coordinates on said second axis, the distance between said coordinates comprising the dimension of the scan area at least immediately adjacent the scanable surface.

5. Apparatus as defined in claim 4 wherein each slidable member of said first and second sets of members comprises a relatively flat bar that extends from its respective recess a substantial distance onto the scanable surface to enable a user to closely identify the location of the coordinate that is being defined.

6. Apparatus as defined in claim 4 wherein each slidable member of said first and second sets of members comprises a pointer that extends from its respective recess adjacent to the scanable surface to enable a user to closely identify the location of the coordinate that is being defined.

7. Apparatus as defined in claim 1 wherein said first set of slidable members comprise four members, two of which are located and retained in each of the first and third recesses extending along said first axis on opposite sides of the scanable surface, said four members being independently slidable in said recesses and positionable along the scanable surface to define first and second coordinates on each side of said scanable surface on said first axis, the distance between said first and second coordinates on the same side comprising the dimension of the scan area at least immediately adjacent the scanable surface, straight lines extending between said first and second coordinates to the respective first and second coordinates on the opposite side of the scanable surface defining a scan area portion along said first axis.

8. Apparatus as defined in claim 7 wherein said second set of slidable members comprise four members, two of which are located and retained in each of second and fourth recesses extending along said second axis on opposite sides of the scanable surface, said four members being independently slidable in said recesses and positionable along the scanable surface on said second axis, the distance between said first and second coordinates on the same side comprising the dimension of the scan area at least immediately adjacent the scanable surface, straight lines extending between first and second coordinates on one side to the respective first and second coordinates on the opposite side of the scan surface defining a scan area portion along said second axis, the scan area being defined by the coextensive scan area portions along said first and second axis.

9. Apparatus as defined in claim 1 further comprising a switch for generating a scan signal and applying the same to said control interface.

10. Apparatus for scanning an item and producing a scanned digital image of at least a portion of the item, comprising:
  a scanner having a scan surface of a first predetermined size and shape for holding and presenting an item to be scanned;
  a positioning apparatus having a plurality of coordinate specifying members for defining coordinates which together can specify a valid bounded scan area on said surface, and generating signals that identify said coordinates;
  a control interface for controlling the initiation and completion of a scan operation including the selective scanning of a portion of the scan surface responsive to said coordinate identifying signals being applied thereto, said control interface examining said coordinate identifying signals to determine that a valid bounded scan area is specified;
  wherein said scanner selectively scans a portion of the scan surface that represents a valid bounded scan area that is specified by defined coordinates and produces a scanned digital image thereof responsive to a scan being initiated and completed by said control interface.

11. Apparatus as defined in claim 10 wherein said positioning apparatus comprises a user input device that is capable of defining a valid bounded scan area having various shapes and sizes.

12. Apparatus as defined in claim 10 wherein said positioning apparatus comprises:
  a first set of slidable members located on a first axis adjacent the scanable surface for defining coordinates of the scan area along said first axis thereof and generating signals indicative of said coordinates; and
  a second set of slidable members located on a second axis generally perpendicular to said first axis, said second axis being adjacent the scanable surface, said second set of slidable members defining coordinates of the scan area along said second axis thereof and generating signals indicative of said coordinates.

13. A method for scanning a scan area within a scanable surface, comprising the steps of:
  defining a scan area using an L-shaped housing that includes a first and a second set of slidable members, the first set including at least two X coordinates, and the second set including at least two Y coordinates, and wherein the housing is an external attachment to a standard scanner;
  determining whether said scan area is contained entirely within the scanable surface; and
  scanning a scanable portion of said scan area if said scan area is not contained entirely within the scanable surface; and
  scanning the entire scan area if said scan area is contained entirely within the scanable surface.

14. The method as defined in claim 13 wherein said defining, determining and scanning steps comprise functionality that can be selectively enabled and disabled.

15. The method as defined in claim 14 wherein the method further comprises:
  determining whether said functionality is enabled;
  scanning said scanable surface when said functionality is not enabled; and
  determining whether said scan area is valid when said functionality is enabled.

16. A method for scanning a scan area within a scanable surface of a scanning device using an L-shaped positioning apparatus communicatively attached to the scanning device and having a plurality of members for defining a plurality of X and Y coordinates of the scan area, said method comprising the steps of:
  positioning selected ones of said plurality of members to define said plurality of X and Y coordinates of the scan area;
  determining whether said scan area is contained entirely within the scanable surface; and
  scanning the scan area.

17. The method as defined in claim 16 wherein said positioning, determining and scanning steps comprise functionality that can be selectively enabled and disabled.

18. The method as defined in claim 17 wherein the method further comprises:
   determining whether said functionality is enabled;
   scanning said scanable surface when said functionality is not enabled; and
   determining whether said scan area defined by said plurality of members is valid when said functionality is enabled.

19. The method as defined in claim 18 wherein said step of determining whether said scan area is valid further comprises the step of returning an error message to the user when said scan area defined by said plurality of members is not valid.

20. The method as defined in claim 18 wherein said scan area is valid when it is a bounded area.

21. The method as defined in claim 16 further comprising the steps of:
   constructing a digital file of said scan area; and
   sending said digital file to a previously specified destination.

22. The method as defined in claim 16, further comprising:
   determining whether said scan area as specified by the defined coordinates is contained entirely within the scanable surface;
   scanning a scanable portion of said scan area if said scan area is not contained entirely within the scanable surface; and
   scanning the entire scan area if said scan area is contained entirely within the scanable surface.

23. A system for scanning a scan area within a scanable surface of a scanning device using an L-shaped positioning apparatus communicatively attached to the scanning device and having a plurality of members for defining a plurality of X and Y coordinates of said scan area on a scanable surface of a scanning device, said system comprising:
   means for determining whether said scan area is contained entirely within the scanable surface;
   means for scanning the scanable portion of said scan area if said scan area is not contained entirely within the scanable surface, and
   for scanning said entire scanable surface if said scan area is contained entirely within the scan surface.

* * * * *

UNITED STATES PATENT AND TRADEMARK OFFICE
CERTIFICATE OF CORRECTION

| | | |
|---|---|---|
| PATENT NO. | : 6,870,648 B2 | Page 1 of 1 |
| APPLICATION NO. | : 09/783796 | |
| DATED | : March 22, 2005 | |
| INVENTOR(S) | : Robert Sesek et al. | |

It is certified that error appears in the above-identified patent and that said Letters Patent is hereby corrected as shown below:

In column 6, line 55, in Claim 1, after "wherein" insert -- said --.

In column 6, line 56, in Claim 1, delete "comprise" and insert -- comprises --, therefor.

In column 7, line 45, in Claim 8, after "surface" insert -- to define first and second coordinates on each side of said scanable surface --.

In column 7, line 53, in Claim 8, delete "axis" and insert -- axes --, therefor.

Signed and Sealed this

Third Day of November, 2009

David J. Kappos
*Director of the United States Patent and Trademark Office*